US010740696B2

(12) United States Patent
Smith

(10) Patent No.: US 10,740,696 B2
(45) Date of Patent: Aug. 11, 2020

(54) COMPLIANCE MANAGEMENT

(75) Inventor: Casey Joe Smith, Whitmore Lake, MI (US)

(73) Assignee: ESPEC SOFTWARE, LLC., Elko, NV (US)

( * ) Notice: Subject to any disclaimer, the term of this patent is extended or adjusted under 35 U.S.C. 154(b) by 708 days.

(21) Appl. No.: 13/593,598

(22) Filed: Aug. 24, 2012

(65) Prior Publication Data

US 2014/0055625 A1 Feb. 27, 2014

(51) Int. Cl.
*G06Q 10/10* (2012.01)
*G06Q 10/00* (2012.01)
*G06Q 30/00* (2012.01)

(52) U.S. Cl.
CPC ........... *G06Q 10/00* (2013.01); *G06Q 10/103* (2013.01); *G06Q 30/018* (2013.01)

(58) Field of Classification Search
CPC .... G06F 3/0481; G06Q 10/00; G06Q 30/018; G06Q 10/103
USPC ......... 348/135; 382/141, 152; 705/306, 317, 705/342; 715/764, 784
See application file for complete search history.

(56) References Cited

U.S. PATENT DOCUMENTS

| 8,533,055 B1* | 9/2013 | Brazil | G06Q 30/00 705/26.1 |
| 2006/0259392 A1* | 11/2006 | Rabenold | G06Q 10/10 705/37 |
| 2009/0157521 A1* | 6/2009 | Moren | G06Q 10/10 705/1.1 |
| 2009/0265193 A1* | 10/2009 | Collins | G06Q 30/0185 705/4 |
| 2010/0039319 A1* | 2/2010 | Cameron | B66C 13/16 342/357.27 |
| 2010/0082842 A1* | 4/2010 | Lavrov | G06F 17/30241 709/248 |
| 2011/0173127 A1* | 7/2011 | Ho | G06Q 10/00 705/317 |
| 2012/0139696 A1* | 6/2012 | McQuade | G07C 5/008 340/5.7 |
| 2012/0216106 A1* | 8/2012 | Casey | G06F 17/243 715/224 |

(Continued)

OTHER PUBLICATIONS

Olminkof. Introducing the Auto Claims Management sample solution template for IBM Case Manager. ibm.com. Jan. 20, 2011. [Retrieved on: Jun. 5, 2020]. Retrieved from internet: <URL:https://www.ibm.com/developerworks/data/tutorials/dm-1101casemanagertemplates2/>. entire document (Year: 2011).*

*Primary Examiner* — Tamara Griffin
(74) *Attorney, Agent, or Firm* — Cantor Colburn LLP

(57) ABSTRACT

Implementing compliance management includes displaying a checklist of inspection items on a display of a mobile communications device at an inspection site of an entity. Each of the inspection items is mapped to a corresponding compliance code governing environmental regulatory requirements for operation and maintenance of the entity. The compliance management also includes receiving a user response indicative of an inspection condition for each of the inspection items. The user response is implemented via an input control on the mobile communications device. The compliance management further includes transmitting user responses over a network to a centralized database system. The centralized database system provides web-based access of the user responses to the entity over the network.

11 Claims, 12 Drawing Sheets

(56) References Cited

U.S. PATENT DOCUMENTS

| | | | | |
|---|---|---|---|---|
| 2013/0060710 A1* | 3/2013 | Preuss | ................... | G06Q 50/16 705/314 |
| 2013/0230250 A1* | 9/2013 | Yates | ................... | G06K 9/6254 382/190 |
| 2014/0283008 A1* | 9/2014 | Daino | ................. | G06F 21/6218 726/17 |

* cited by examiner

INSPECTION MANAGMENT / SITE MANAGEMENT / SECTION MANAGEMENT

ADD NEW FACILITY

NAME
NUMBER
TYPE (PUBLIC OR PRIVATE)
ADDRESS    CITY    STATE  ZIP
CONTACT NAME
CONTACT PHONE NUMBER
COMMENTS
SITE PHOTO   BROWSE...

ADD SITE

FIG. 3

INSPECTION MANAGEMENT / SITE MANAGEMENT / SECTION MANAGEMENT

- FACILITY XXX - HOWELL - 7/15/2012 >
- FACILITY XXX - HOWELL - 7/27/2012 >
- FACILITY XXX - MASON - 7/30/2012 >
- FACILITY XXX - ANN ARBOR - 7/31/2012 >
- FACILITY YYY - HOWELL - 7/31/2012 >
- FACILITY YYY - ANN ARBOR - 8/1/2012 >
- FACILITY YYY - SOUTH LYON - 8/2/2012 >
- FACILITY ZZZ - ANN ARBOR - 8/2/2012 >
- FACILITY ZZZ - SOUTH LYON - 8/2/2012 >

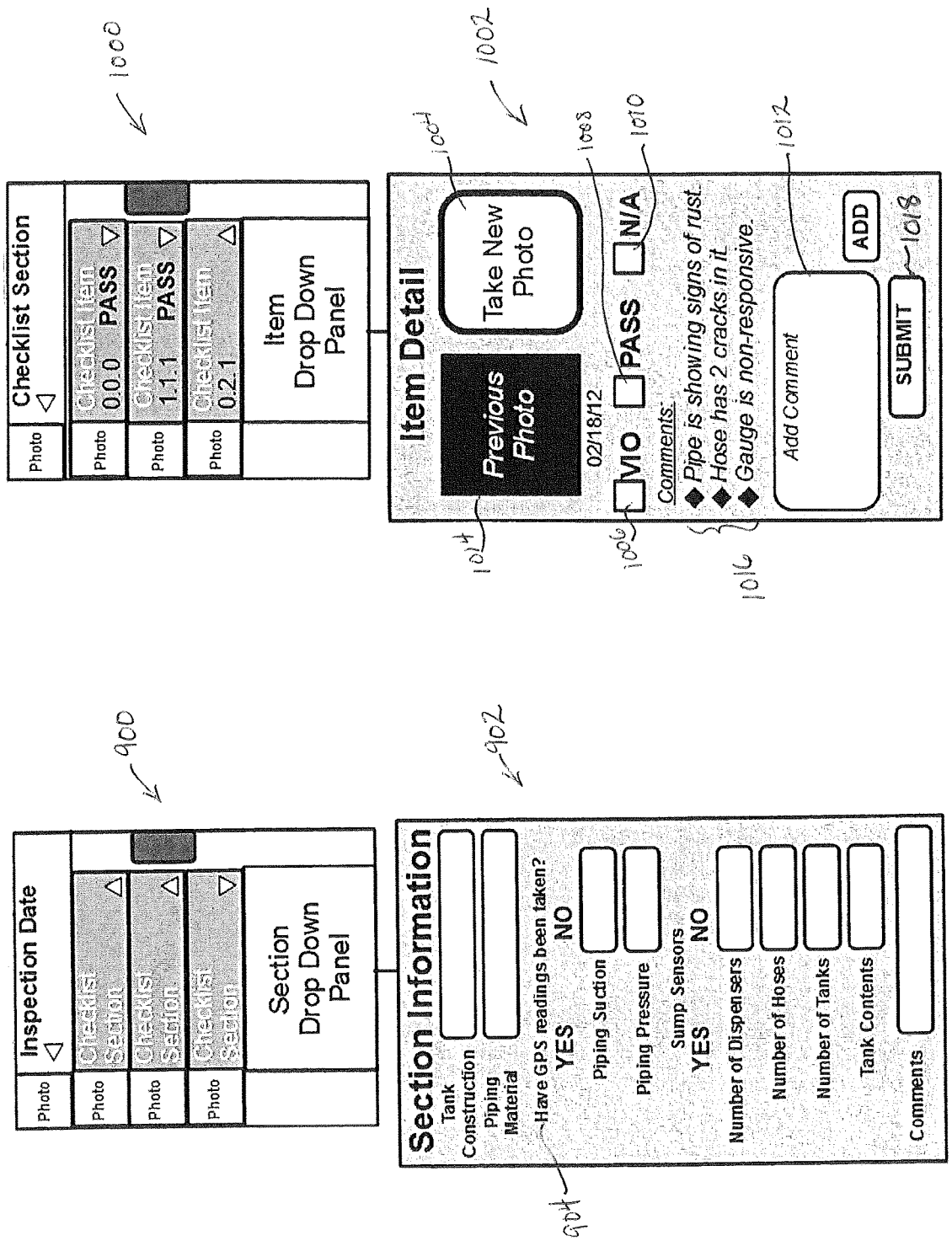

1100

PHOENIX ENVIRONMENTAL, INC.
Underground Storage Tank Facility Inspection Checklist

| XXX Communications, LLC. | | FACILITY I.D. NUMBER |
|---|---|---|
| FACILITY NAME | | |
| John Doe | | Private |
| CONTACT PERSON ON SITE | PHONE NUMBER | FACILITY TYPE |
| Mike Smith | | 07/20/12 |
| INSPECTOR | LICENSE NUMBER | DATE |

1102

Summary

\*\*\*Failure in Piping Section\*\*\*
\*\*\*Failure in Dispenser Section\*\*\*

Piping Section

Release detection for piping
Section: 280.40   Code: U71
✔ PASSED
Comments: - 07/20/12: Release detection present.
- 06/13/12: Could not access equipment.

Line leak detector installed
Section: 280.44a   Code: U76
✔ PASSED
Comments: - 07/20/12: Line leak detector replaced and functioning.
- 06/13/12: Not responsive. Needs replacement.

Cathodic protection for piping
Section: 280.20   Code: U29
✘ FAILED
Comments: - 07/20/12: Tanks not protected.
- 06/13/12: New tanks to be installed.

Dispenser Section

Dispenser violation
Section: 6.1   Code: S10
✘ FAILED
Comments: - 07/20/12: See violation on section 6.6.6.
- 06/13/12: No violations present.

Dispenser loc. (10' prop & openings)
Section: 6.2.3.   Code: S11
✔ PASSED
Comments:

Dispenser protected; damage/secured
Section: 6.3.4.   Code: S13
✔ PASSED
Comments: - 07/20/12: New protection in place
- 06/13/12: Needs an upgrade

Underground Tank Section

Tank misc. violation
Section: 280.20.   Code: S30
✔ PASSED
Comments:

Spill containment - Testing request
Section: 280.20c   Code: U51
✔ PASSED
Comments:

Spill containment - Inoperative
Section: 280.20c   Code: U101
✔ PASSED
Comments: - 07/20/12: Operating within code standards
- 06/13/12: Inoperative

Tight fitting hose conn (1,000 & up)
Section: 2.3.3.4.3   Code: U44
✔ PASSED
Comments:

FIG 11A

| Release Detection | |
|---|---|
| Release detection for tanks<br>Section: 280.40    Code: U71<br>✔ PASSED | Comments: |
| Inventory control (not stand alone)<br>Section: 280.43a    Code: S42<br>✔ PASSED | Comments: |
| Manual gauging (less than 550)<br>Section: 280.43b    Code: S43<br>✔ PASSED | Comments: |
| Tank tightness testing<br>Section: 280.43c    Code: S44<br>✔ PASSED | Comments: |

| Operation Section - Continued | |
|---|---|
| Fire extinguisher, 100 feet<br>Section: 9.2.5.2.    Code: S59<br>✔ PASSED | Comments: |
| Dispenser in view and communicate<br>Section: 9.4.5.    Code: S92<br>✔ PASSED | Comments: |
| Financial Responsibility<br>Section: 280.93    Code: U92<br>✔ PASSED | Comments: |
| Display proof of registration<br>Section: 280.22h    Code: S44<br>✔ PASSED | Comments: - 07/20/12: Displayed in a easy to see location.<br>- 06/13/12: Not displayed |
| Registration submitted 30 days<br>Section: 280.22a    Code: S62<br>✔ PASSED | Comments: |

| Records | |
|---|---|
| Maintenance records<br>Section: 280.34    Code: S65<br>✔ PASSED | Comments: |
| Line leak detector tested<br>Section: 280.44a    Code: S95<br>✔ PASSED | Comments: |
| Line tightness test - pressure<br>Section: 280.41b    Code: U88<br>✔ PASSED | Comments: |

FIG 11B

COMPLIANCE MANAGEMENT

BACKGROUND

The present invention relates to compliance management, and more specifically, to compliance management for regulated facilities.

Businesses that are governed by local, state, and/or federal regulations are typically responsible for adopting a plan or course of action, such as monitoring and inspecting equipment and conditions related to the business in order to ensure compliance with these regulations. In addition, in many cases, individuals who perform inspections as part of the course of action must be certified or licensed to do so. Thus, the businesses must ensure that the individuals performing the inspection are qualified (e.g., through some authorized training process) and that the inspectors' qualifications (e.g., license) are always up-to-date.

Most businesses implement a manual process in which an inspector or authorized individual addresses items for inspection using a printed checklist of the items to inspect as a guide. This manual process can be cumbersome and is prone to errors, particularly in situations where a large number of regulations promulgated by multiple sources of regulatory agencies are involved. An updated checklist is required whenever changes are made to these supervening laws or regulations, which means each business or business unit must monitor for these changes and update the checklists accordingly. In addition, monitoring the performance of inspectors can be time consuming and error prone. A completed checklist returned by an inspector after an inspection may not always yield accurate inspection results, as the quality of the inspection may vary from inspector to inspector. Thus, monitoring inspector performance may require on-site supervision of inspections at the time of the inspection or a second inspection performed shortly thereafter.

SUMMARY

According to one embodiment of the present invention, a mobile communications device is provided. The mobile communications device includes a computer processor and inspection logic executable by the computer processor. The inspection logic implements a method. The method includes displaying a checklist of inspection items on a display of the mobile communications device at an inspection site of an entity. Each of the inspection items is mapped to a corresponding compliance code governing environmental regulatory requirements for operation and maintenance of the entity. The method also includes receiving a user response indicative of an inspection condition for each of the inspection items. The user response is implemented via an input control on the mobile communications device. The method further includes transmitting user responses over a network to a centralized database system. The centralized database system provides web-based access of the user responses to the entity over the network.

According to a further embodiment of the present invention, a method is provided. The method includes displaying a checklist of inspection items on a display of a mobile communications device at an inspection site of an entity. Each of the inspection items is mapped to a corresponding compliance code governing environmental regulatory requirements for operation and maintenance of the entity. The method also includes receiving a user response indicative of an inspection condition for each of the inspection items. The user response is implemented via an input control on the mobile communications device. The method further includes transmitting user responses over a network to a centralized database system. The centralized database system provides web-based access of the user responses to the entity over the network.

According to another embodiment of the present invention, a computer program product is provided. The computer program product includes a storage medium having instructions embodied thereon, which when executed by a computer processor cause the computer processor to implement a method. The method includes displaying a checklist of inspection items on a display of the mobile communications device at an inspection site of an entity. Each of the inspection items is mapped to a corresponding compliance code governing environmental regulatory requirements for operation and maintenance of the entity. The method also includes receiving a user response indicative of an inspection condition for each of the inspection items. The user response is implemented via an input control on the mobile communications device. The method further includes transmitting user responses over a network to a centralized database system. The centralized database system provides web-based access of the user responses to the entity over the network.

According to yet another embodiment of the present invention, a system is provided. The system includes a computer processor and a service application executable by the computer processor. The service application is configured to implement a method. The method includes generating a first database containing inspection items, and mapping each of the inspection items to a corresponding compliance code governing environmental regulatory requirements for operation and maintenance of an entity subject to inspection. An inspection item identifier stored in the first database is linked as a primary key to a compliance code database that stores compliance codes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 3-5 depict user interface screens used in implementing the compliance management processes in exemplary embodiments;

FIGS. 7-11 depict user interface screens used in implementing the compliance management processes in exemplary embodiments.

DETAILED DESCRIPTION

Compliance management through facilitated inspections is provided in exemplary embodiments. The compliance management provides the ability to standardize inspection processes and inspector qualifications to ensure compliance of laws and regulations governing a business or organization. The compliance management processes provide up-to-date compliance codes that are mapped to corresponding inspection items, and inspection software executable by a mobile inspection device implements various business rules applied to inspection data entered in response to on-site inspections. The results, which reflect conditions of the items inspected, are uploaded or otherwise transmitted to a centralized database system for further processing and access by authorized entities. The compliance management processes described herein are directed to environmental regulations related to the fuel industry.

Figure 1:
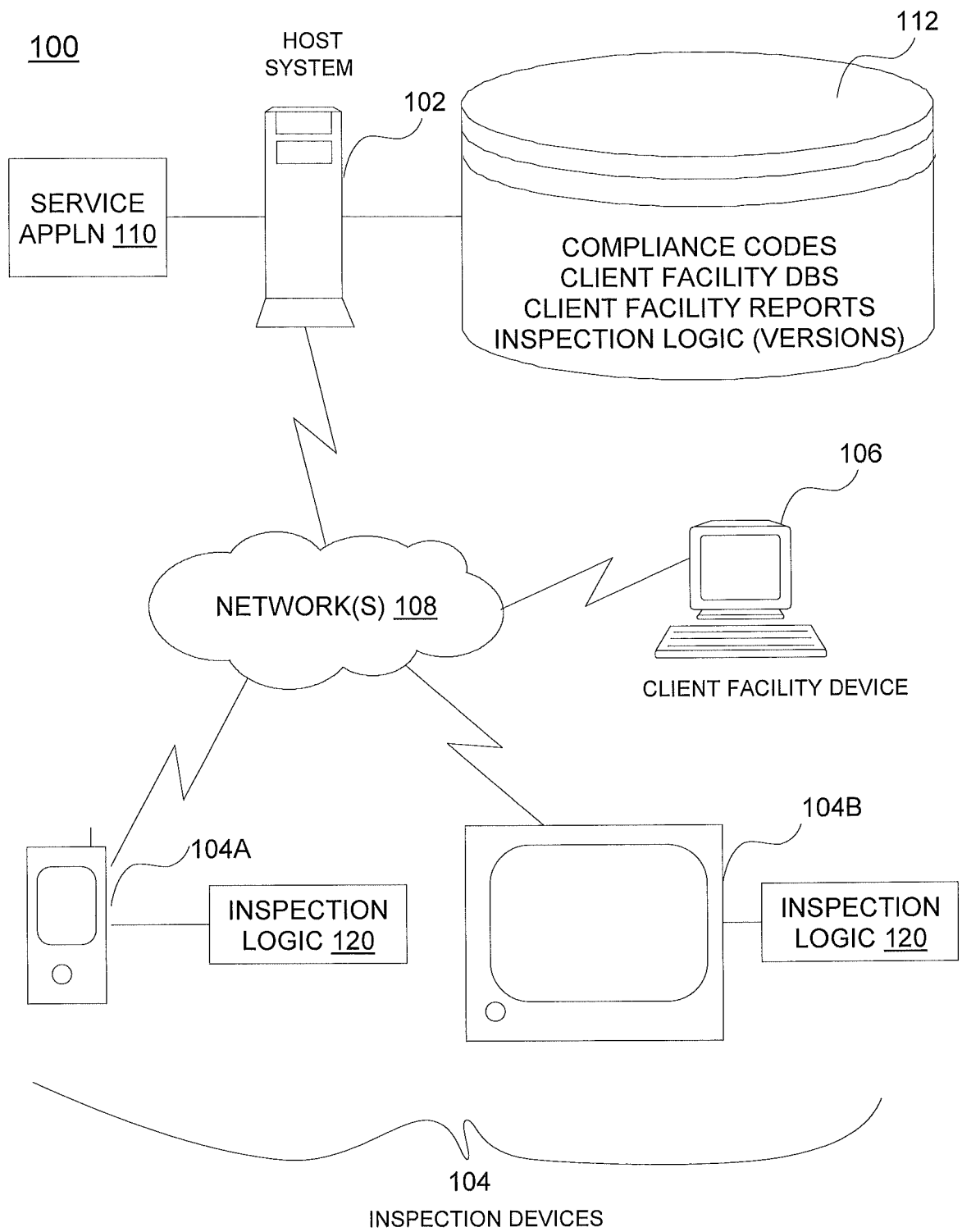
FIG. 1 is a block diagram depicting a system upon which compliance management may be implemented in exemplary embodiments.

With reference now to FIG. 1, an exemplary system 100 upon which the compliance management processes may be implemented will now be described. The system 100 includes a host system computer 102, a client facility device 106, and inspection devices 104 communicatively coupled to one or more networks 108.

The host system computer 102 may include a high-speed computer processing device capable of handling a large volume of transactions conducted between the host system computer 102 and the client facility device 106 and inspection devices 104. In an embodiment, the host system computer 102 is implemented by an entity that manages the compliance management processes for a number of client facilities relating to the fuel industry (e.g., client facility 106), e.g., under a service agreement. For example, the client facility may be a service station that dispenses fuel to the public. The entity builds and manages databases of inspection-related data items and maps these items to corresponding compliance codes (e.g., identifiers of regulations governing the client facilities). The entity may also be responsible for hiring, training, and overseeing inspectors that perform on-site inspections at the client facilities. In addition, the entity may provide a client application that is executable by a mobile processing device (e.g., inspection device 104) and guides inspectors through an inspection process.

In an alternative embodiment, the host system computer 102 may be implemented by an entity that manages its own on-site inspections. In this embodiment, the inspection sites are directly managed by the entity (e.g., a corporate organization that owns or leases a number of service stations).

The host system computer 102 executes computer instructions for performing the compliance management processes described herein. These computer instructions are referred to herein as service application 110. The service application 110 includes configurable rules that are applied to data collected by the host system computer 102, as will be described further herein.

The host system computer 102 may be implemented using one or more servers operating in response to a computer program stored in a storage medium accessible by the server. The host system computer 102 may operate as a network server (e.g., a web server) to communicate with network entities, such as the inspection devices 104 and the client facility device 106. The host system computer 102 handles sending and receiving information to and from the network entities and can perform associated tasks.

The host system computer 102 may also operate as an application server. As described above, the host system computer 102 may execute one or more computer programs to provide the compliance management processes. Processing may be shared by the host system computer 102, the inspection devices 104, and the client facility device 106 by providing an application (e.g., java applet) to the inspection devices 104 and/or the client facility device 106. Alternatively, the inspection devices 104 and the client facility device 106 can include stand-alone software applications for performing a portion of the processing described herein. As previously described, it is understood that separate servers may be utilized to implement the network server functions and the application server functions. Alternatively, the network server and the application server may be implemented by a single server executing computer programs to perform the requisite functions.

In one embodiment, the compliance management processes provide a user interface that enables users to configure the inspection service databases and business rules, process inspection results, and generate inspection reports. The user interface is described further in FIGS. 3-5.

The inspection devices 104 may be portable communications devices that can be remotely operated at designated inspection sites. As shown in FIG. 1, the inspection devices 104 include a smart phone 104A and a tablet computer 104B. The inspection devices 104 each execute computer instructions for performing a portion of the facilitated inspection processes described herein. These computer instructions are referred to herein as inspection logic 120. The inspection logic 120 includes a user interface that guides an inspector through an inspection process. The user interface is described further in FIGS. 7-10. The inspection devices 104 include wireless network adapters and related hardware that is configured to communicate inspection data over the networks 108 to the host system computer 102. In addition, the inspection devices 104 include an embedded digital camera, as well as a global positioning system (GPS) or other locator system.

The client facility device 106 is implemented by a registered user of the compliance management processes described herein. The client facility device 106 may be a general-purpose computer device, such as a desktop, laptop, or host-attached computer. In an embodiment, the client facility device 106 includes a web browser application that enables a user to access inspection data from the host system computer 102 over the networks 108 via, e.g., a web site of the host system computer 102. This access may be restricted to authorized inspection data that relates to the user's facility. While only one client facility device 106 representing a single registered client is shown in FIG. 1 for ease of illustration, it will be understood that any number of client facilities and associated devices may be employed in realizing the advantages of the exemplary embodiments described herein.

The host system computer 102 is communicatively coupled to a storage device 112. The storage device 112 may be part of a centralized database system that includes multiple sub-storage systems and database management applications and devices for storing electronic information. It is understood that the storage device 112 may be implemented using memory contained in the host system computer 102 or may be a separate physical device (e.g., as shown in FIG. 1). The storage device 112 may be logically addressable as a consolidated data source across a distributed environment that includes networks 108. Information stored in the storage device 112 may be retrieved and manipulated via the host system computer 102 and/or via the client facility device 106 and inspection devices 104. In one exemplary embodiment, the storage device 112 stores compliance codes, client facility databases, client facility reports, and inspection logic, as will be described further herein.

As indicated above, the compliance codes may be implemented as identifiers of government agency regulations that are assigned to correlated inspection items. The client facility databases in the storage device 112 may be maintained for registered client facilities (e.g., client facility device 106). The host system computer 102 maintains database information for each client facility. In addition, the inspection results are processed by the service application 110 and are accessible by respective client facilities over the networks 108 pending an authentication process to ensure authorized use. In an embodiment, the client facilities may request inspection reports pertaining to their own facilities. The inspection logic (e.g., inspection logic 120) and all versions of the inspection logic may be maintained in the storage device 112. As new regulations are promulgated, the service application 110 is configured to update the compliance codes accordingly, and new versions of the inspection logic 120 are generated.

The networks 108 may be any type of known networks including, but not limited to, a wide area network (WAN), a local area network (LAN), a global network (e.g. Internet), a virtual private network (VPN), and an intranet. The networks 108 may be implemented using a wireless network or any kind of physical network implementation known in the art. For example, the client facility device 106 and inspection devices 104 may be coupled to the host system computer 102 through multiple networks (e.g., intranet and Internet). One or more of the client facility device 106 and the inspection devices 104 may be connected to the networks 108 in a wireless fashion, e.g., through cellular, satellite, and/or terrestrial networks.

Figure 2:
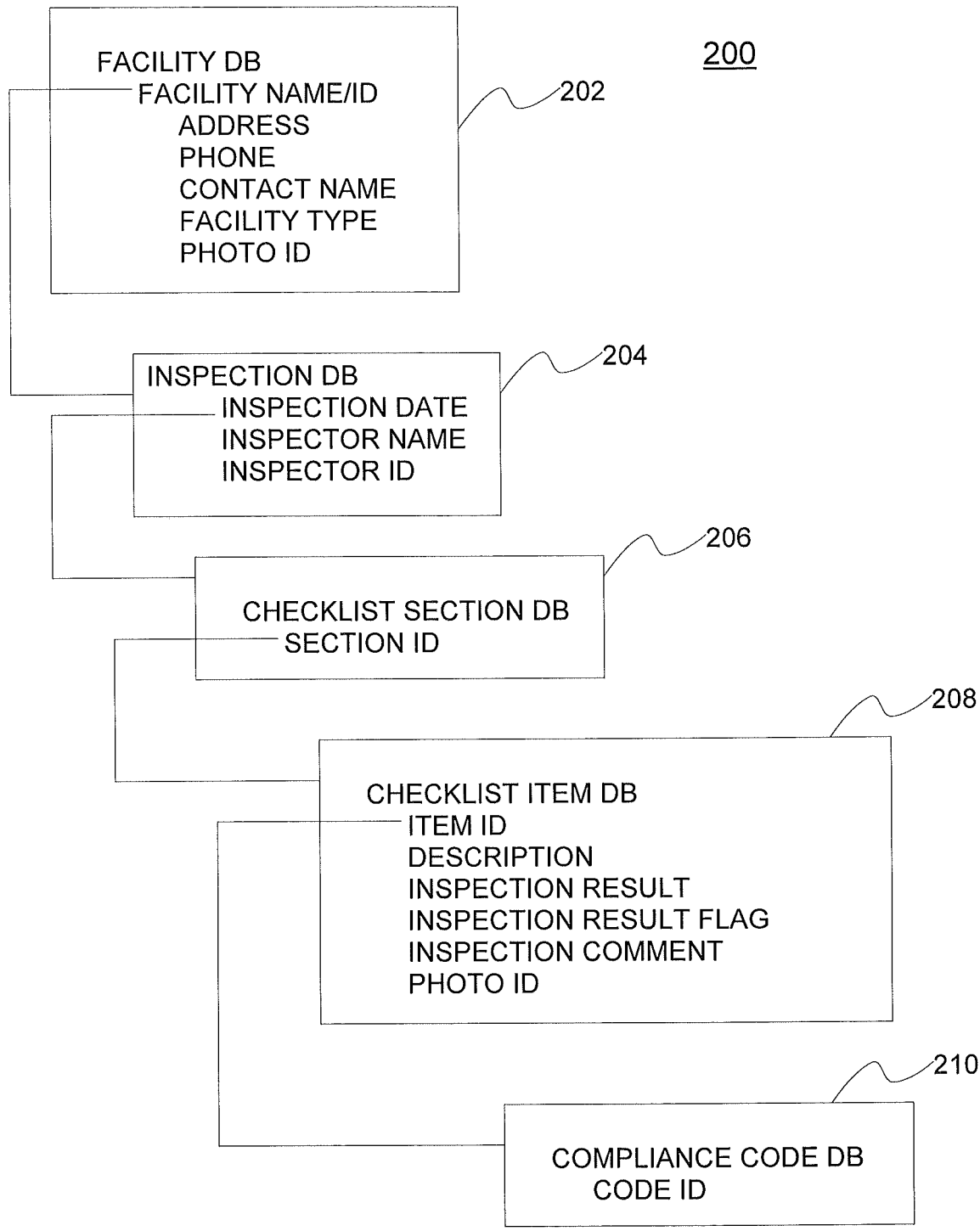
FIG. 2 depicts database tables with sample data items that may be utilized by the compliance management processes in exemplary embodiments.

As indicated above, the host system computer 102 may be configured via the service application 110 to build and manage databases of inspection-related data items and map these items to corresponding compliance codes. Turning now to FIG. 2, a group of tables 200 with sample data items will now be described in an exemplary embodiment.

For each facility serviced by the host system computer 102, a database 202 of facilities is created. The database 202 includes fields, such as facility name and/or identifier, facility address, facility phone number, facility contact name, facility type, and photo ID. The database 202 may be searchable by any of the fields therein. The facility type field may include values of "private" and "public" whereby "private" indicates the facility or inspection site is not open to the public and "public" indicates the facility is open to the public. Differentiating between private and public facilities can be useful in assessing certain inspection criteria (e.g., in a public facility there may be different or additional inspection items provided for a given inspection checklist). The photo ID field may be used to identify a photograph taken of the external premises of the facility. In an embodiment, the facility name and/or identifier is used as a primary key or link to an inspection database 204.

The inspection database 204 identifies a listing of the dates of each inspection previously performed for a facility (or an inspection site of the facility where more than one inspection sites exist for a given facility). The inspection database 204 includes fields, such as inspection date, inspector name, and inspector ID. The database 204 may be searchable by either of these fields. The inspector ID may be a license number that is assigned to the inspector once he/she becomes qualified to perform inspections. In an embodiment, the inspection date field is used as a primary key or link to a checklist section database 206. Tracking inspectors through the inspector ID field enables the enterprise of the host system computer 102 to better track individual inspection performance, as well as facilitate inspector assignments to client facilities.

The checklist section database 206 identifies each section associated with a particular inspection, whereby each section contains a list of inspection items. Each section, in turn, is associated with an identifier that distinguishes the section from other sections. Thus, the checklist section database 206 stores a section ID field for this purpose. A section may refer to a subject or target of a portion of an inspection. For example, where the inspection site is a service station, one section may be designated for fuel tanks and another section may be designated for piping. Alternatively, the sections may correspond to state or federal laws and/or regulations governing inspections of the facilities. In this embodiment, the sections may correspond to actual code sections for a particular regulation. The section ID field is used as a primary key or kink to a checklist item database 208.

The checklist item database 208 identifies each item subject to inspection for a given section. For example, a checklist item may be a directive for the inspector to visually observe a pipe for any signs of degradation. The checklist item database 208 includes fields for item ID, description, inspection result, inspection result flag, inspection comment, and photo ID. The item ID may be any unique identifier assigned to the item. The item description directs the inspector what is required to be performed. The inspection result refers to the input provided by the inspector in response to the item directive. The inspection result flag is set by the inspection logic 120 when a negative inspection result has been entered by the inspector. By flagging negative inspection results, the issues identified as problematic during the inspection can be targeted for independent display and/or notification. For example, if an inspection item result indicates a failure, this inspection item is flagged and the inspection logic 120 makes a copy of this inspection item and result, and displays it prominently on the display screen of the inspection device 104. In addition, this information may be placed in a Summary section of a report generated by a client facility. A user interface screen 1100 depicting a sample report and Summary section 1102 containing the flagged information is illustrated further in FIG. 11. As shown in FIG. 11, the Summary Section 1102 is displayed at the beginning of the report. The inspection comment field enables the inspector to add any desired comment about the inspected item, and the photo ID identifies a digital photograph taken by the inspector of the inspected item. The item ID field is used as a primary key or link to a compliance code database 210.

The compliance code database 210 stores each of the compliance codes associated with inspection items related to an on-site inspection. The compliance codes may be actual codes issued by a regulatory or government agency. When the agency updates these codes, a representative of the entity implementing the host system computer 102 may configure the updates to the compliance code database 210 via the service application 110. Likewise, if the codes affect the nature of the inspection, the inspection items (in database 208) associated with the old compliance code can be updated as well. The primary key of the inspection item identifier automatically links the inspection item to the new compliance code, as shown in FIG. 2. An updated version of the inspection logic 120 may be created and distributed to each of the inspection devices 104 and all current and previous versions may be stored in the storage device 112.

As indicated above, the facilitated inspection processes provide a user interface that enables users to configure the inspection service databases and business rules, process inspection results, and generate inspection reports. Turning now to FIGS. 3-5, the user interface will now be described in an exemplary embodiment.

An administrator or authorized individual (referred to as "user") of the host system computer 102 accesses the service application 110 and a user interface screen 300 is presented. The service application 110 presents three options that are selectable by the user: INSPECTION MANAGEMENT 302, SITE MANAGEMENT 304, and SECTION MANAGEMENT 306.

Selecting the SITE MANAGEMENT 304 option enables the user to add, view, and delete new client facilities. As shown in FIG. 3, the user has selected ADD NEW FACILITY 308 and a list of fields 310 is presented to the user. It will be noted that these fields 310 correspond to the facility database 202 of FIG. 2. Once the user has entered the data for adding a new client facility, the user saves or submits the data by selecting ADD SITE 312, and the service application 110 stores the new client facility information in the storage device 112.

Selecting the INSPECTION MANAGEMENT 302 option enables the user to view all of the previously conducted inspections for a given client facility, as well as currently scheduled inspections that have not yet occurred. Upon selecting the INSPECTION MANAGEMENT 302 option, the service application 110 presents a user interface screen 400A shown in FIG. 4A. As shown in FIG. 4A, a list of inspections for client facilities XXX, YYY, and ZZZ are shown. In addition, the list of inspections displays the date of inspection, as well as the location (where a client has multiple facilities or locations to be inspected). The list of inspections in user interface screen 400A correspond in part to the facility database 202 and the inspection database 204 of FIG. 2.

Figure 4B:
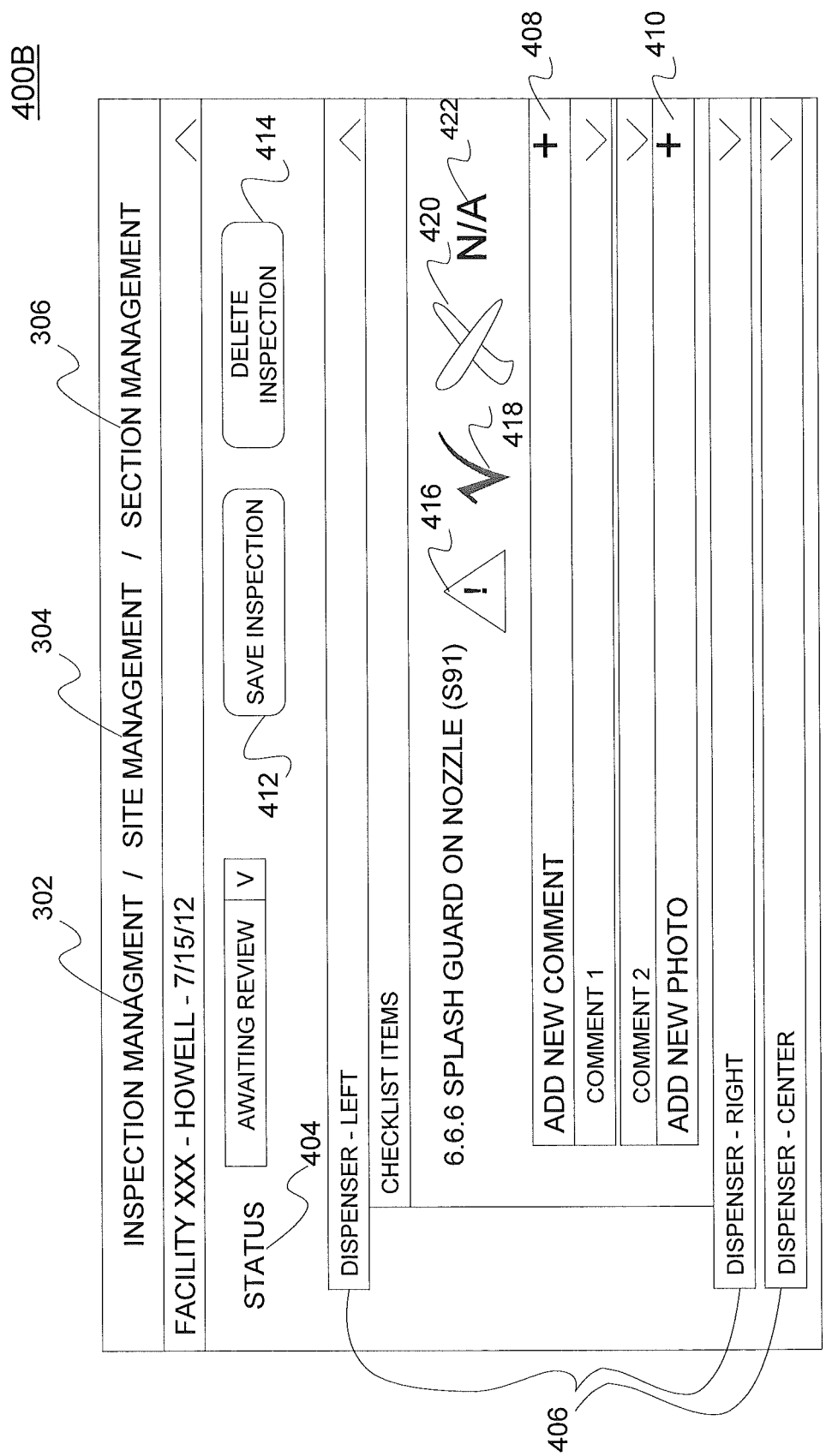

When the user selects an inspection via option 402, the service application 110 retrieves inspection data corresponding to the selection and displays the inspection data in a user interface screen 400B as shown in FIG. 4B. The user interface screen 400B may be a new subwindow presented within a common window illustrated as user interface screen 400A or may be a separate window.

For the selected inspection shown in FIG. 4B, a status indicator 404 is shown as AWAITING REVIEW. The status indicator 404 may be implemented as a drop down feature that includes other selectable values, such as review completed. Awaiting review refers to a status of an inspection that has been performed by an inspector and is subject to review by a supervisor before being released for review or allowed access by the client facility. Once the review is completed (via the status indicator 404), the inspection details are in final form and may be released for access by the client facility. It will be understood that the host system computer 102 may employ safeguards (e.g., firewall and authentication mechanisms) to ensure the privacy and integrity of the inspection data, as well as client facility data stored at the host system computer 102.

In addition, the user interface screen 400B illustrates three inspection items 406: DISPENSER-LEFT, DISPENSER-RIGHT, AND DISPENSER-CENTER. For each inspection item, one or more checklist items are presented. For example, as shown in FIG. 4B, a checklist item 6.6.6 SPLASH GUARD ON NOZZLE (S91) is displayed for the DISPENSER-LEFT item. As shown in FIG. 4B, symbols that indicate an inspection item result or classifier may be used to assist an inspector in rendering inspection results through the inspection device 104. For example, a symbol 416 is selected to indicate the inspection item is incomplete, a symbol 418 is selected to indicate an inspection item has passed, a symbol 420 is selected to indicate an inspection item has failed, and a symbol 422 is selected to indicate that the inspection item listed (e.g., 6.6.6 SPLASH GUARD ON NOZZLE (S91) is not applicable for the current inspection. The user may add a comment by selecting option 408 and may add a new digital photograph be selecting option 410. By way of non-limiting examples, comments may include adding missing data, entering a condition relating to equipment, providing a date in which an equipment item was replaced, adding serial or part numbers, testing results, updated compliance codes, etc.

Once the user is finished with the selected inspection, the user may either save the inspection by selecting option 412 or may delete the inspection by selecting option 414.

Figure 5A:
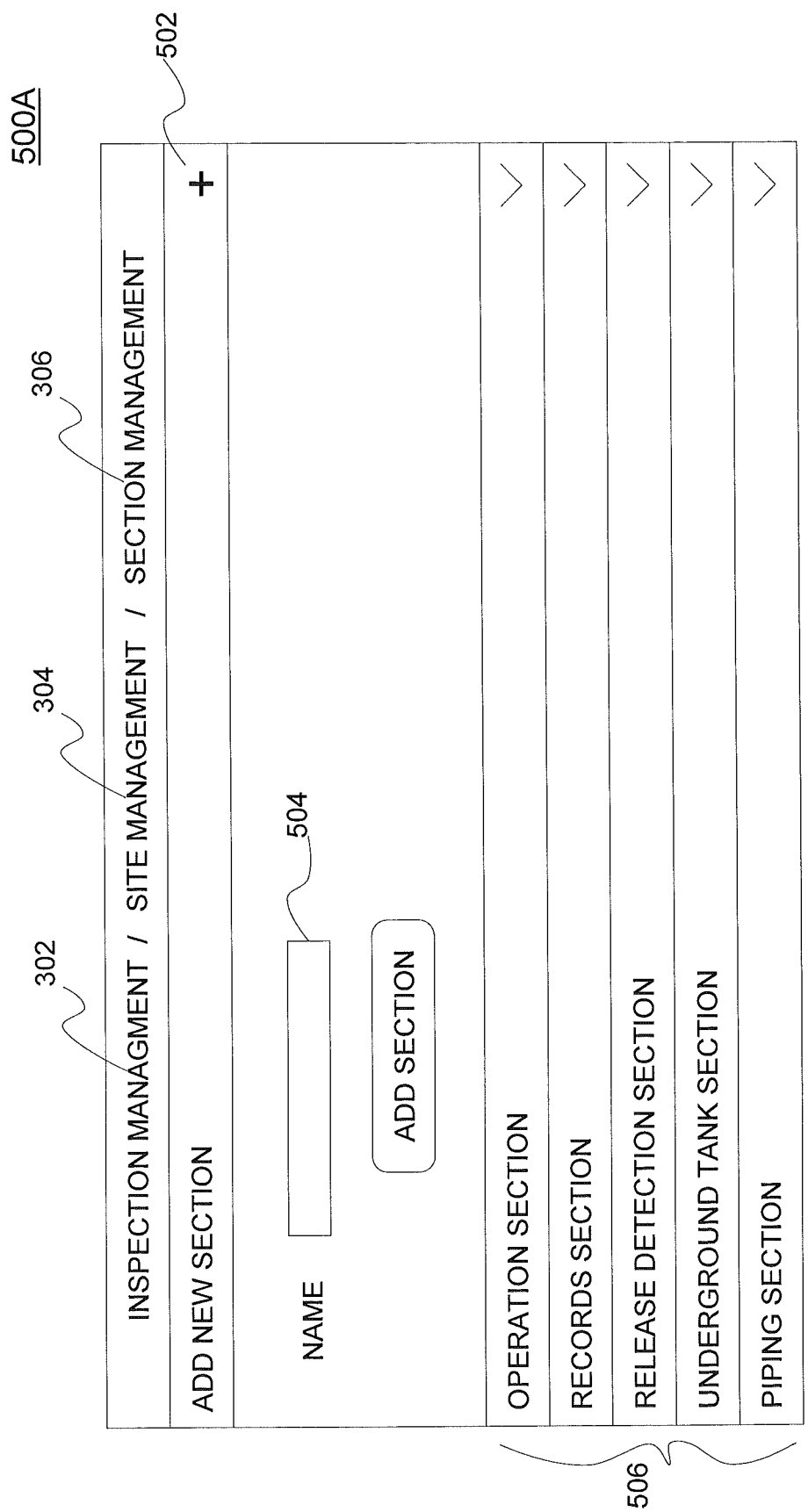
Figure 5B:
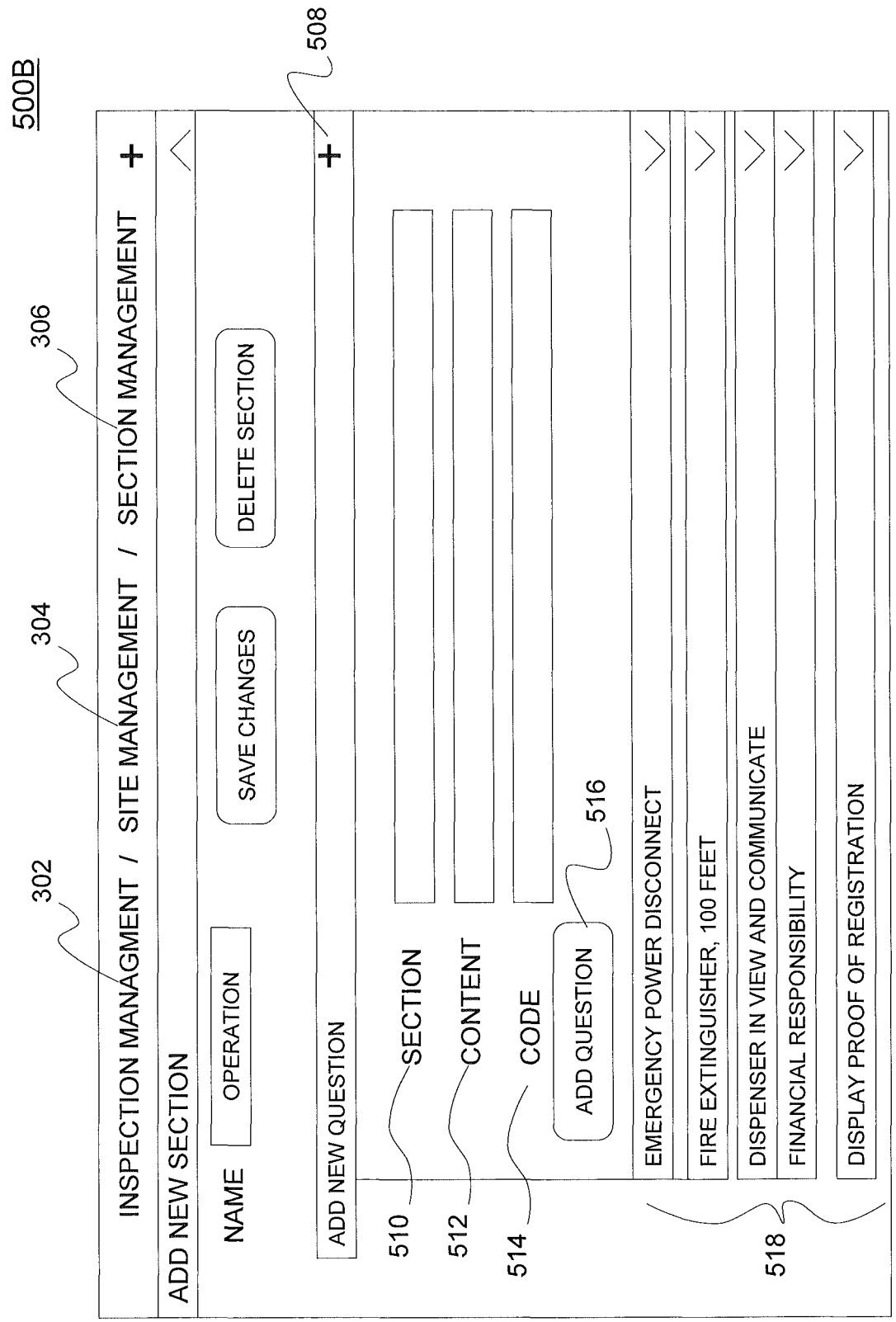

Selecting the SECTION MANAGEMENT 306 option enables the user to view, add, or delete sections associated with an inspection. Upon selecting the SECTION MANAGEMENT 306 option, the service application 110 presents a user interface screen 500A shown in FIG. 5A. Current configured sections are shown generally as 506. As shown in FIG. 5A, the user has selected an option 502 to add a new section. The user then enters a name for the section in a input field 504, and the service application 110 presents a user interface screen 500B of FIG. 5B.

For a section named OPERATION, the user may add a new question for the section by selecting an option 508. The service application 110 displays input fields 510, 512, and 514, and the user enters corresponding data. For example, the user may enter serial or part numbers of equipment, new codes or rule numbers, a date of when annual inspection or testing is due or was performed, etc. The user may then submit the new question by selecting an option 516, and a new subwindow is presented (not shown) for entering this information. Current configured questions are shown generally at 518. The list of sections in user interface screen 500A-500B correspond in part to the checklist section database 206 and the checklist item database 208 of FIG. 2.

Figure 6:
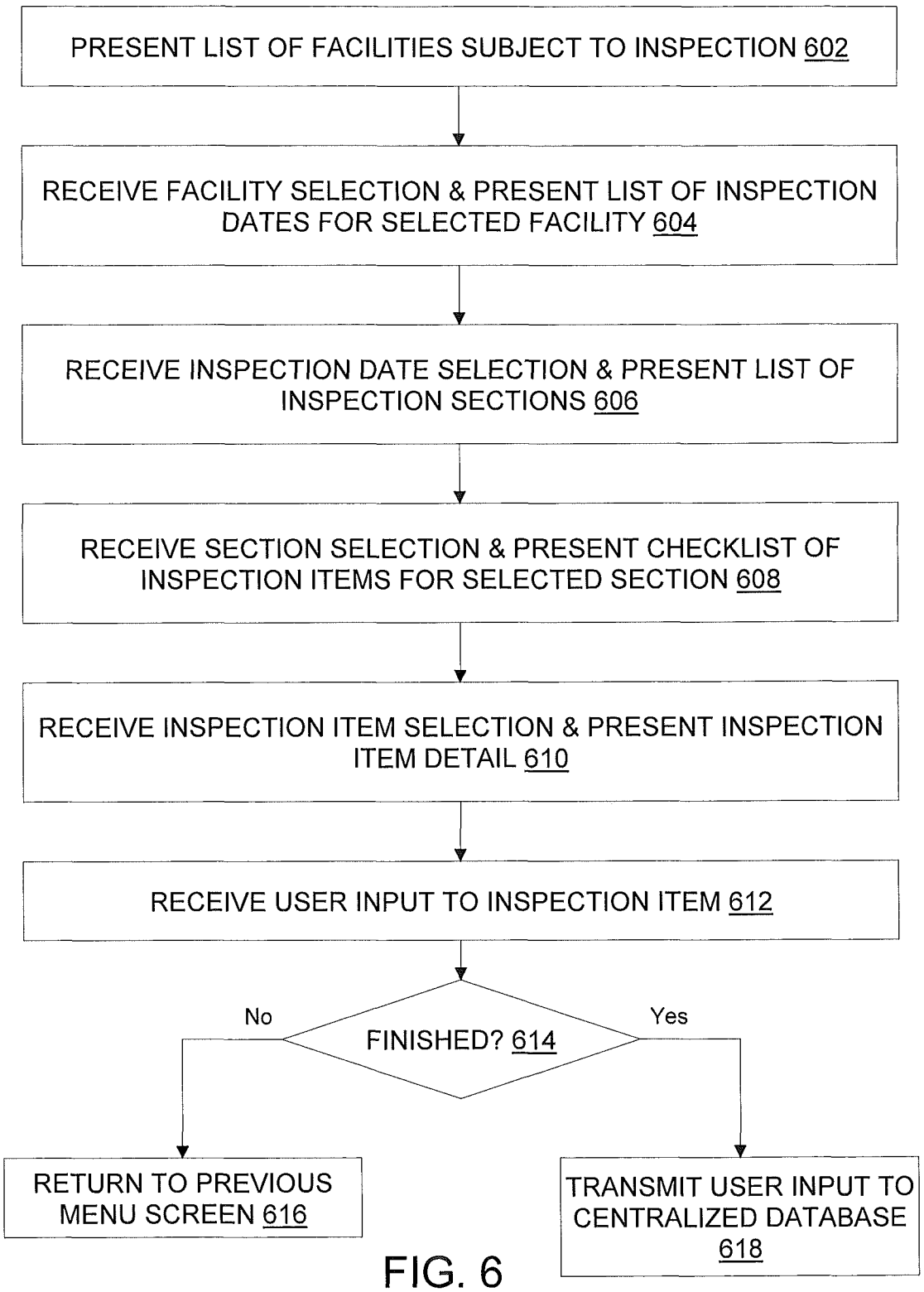
FIG. 6 depicts a flow diagram illustrating a process in which facilitated inspection processes for compliance management may be implemented in exemplary embodiments.

As indicated above, the inspection logic 120 includes a user interface that guides an inspector through an inspection process. Turning now to FIG. 6, a flow diagram describing an exemplary process for implementing facilitated inspections will now be described. The processes described in FIG. 6 assume that a history of previous inspections has occurred for a client facility and that previous inspection results are available to review by an inspector.

The inspector logs in to the inspection logic 120 on the inspection device 104 and, at step 602, the inspection logic 120 presents a list of facilities that have been configured through the service application 110. A user interface screen 700 depicting a list of facilities for selection is shown in FIG. 7.

At step 604, the inspection logic 120 receives a facility selection from input by the inspector, retrieves facility information from memory of the inspection device 104, and presents detailed information about the facility in a subwindow 702 of the user interface screen 700. The data items displayed in the user interface screen 700 correspond to the facility database 202 shown in FIG. 2. In addition, the inspection logic 120 retrieves a list of inspections previously conducted for the selected facility, and presents the list of inspections via a user interface screen 800 on the inspection device 104 as shown in FIG. 8.

Figures 7, 8:
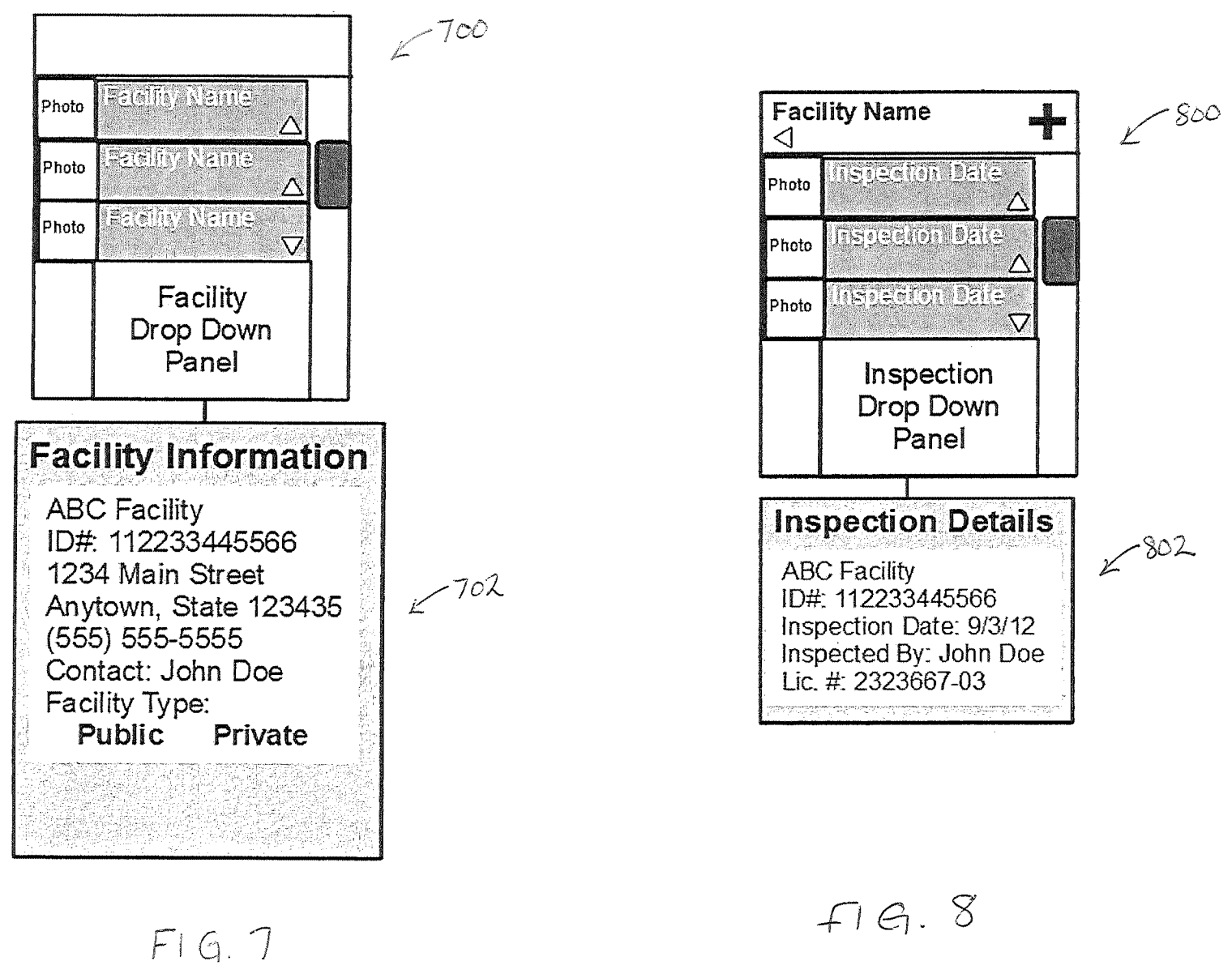

At step 606, the inspection logic 120 receives a selected inspection date from the inspector via the user interface screen 800, retrieves inspection details for the selected inspection, and displays the inspection details in a subwindow 802 of the user interface screen 800 as shown in FIG. 8. The data items displayed in the user interface screen 800 correspond to the inspection database 204 of FIG. 2. In addition, the inspection logic 120 retrieves a list of inspection sections associated with the inspection date selected, and presents the list of sections to the inspector on the inspection device 104, as shown in a user interface screen 900 illustrated in FIG. 9.

At step 608, the inspection logic 120 receives a selected section from the inspector via the user interface screen 900, retrieves section details for the selected section, and displays the section details in a subwindow 902 of the user interface screen 900 as shown in FIG. 9. An inspector may enter values for the section items or these items may be pre-populated with values.

As indicated above, the quality of inspections may vary from inspector to inspector. The compliance management processes facilitate accurate inspection results and accountability of inspectors. For example, in the subwindow 902, an inspector may be required to take GPS (global positioning system) readings at the inspection site (shown generally in subwindow 902 as 904. The GPS readings are mapped to coordinates of the client facility location in order to ensure the inspector has arrived at the proper inspection location. In addition, any photographs taken of inspected items may be tagged with GPS readings via the inspection logic 120 so that the client facility can be assured that the photograph taken correlates to the intended inspection item. The inspection logic 120 may be configured such that an inspection may not be considered 'complete' until the GPS readings are taken. For example, if the inspector attempts to submit inspection results, e.g., by selecting SUBMIT 1018 in FIG. 10, the inspection logic 120 may return an error message requesting the GPS readings. Likewise, the inspection logic 120 may be configured to require selected other fields to be completed before the inspector is permitted to submit inspection results as a completed inspection.

The data items displayed in the user interface screen 900 correspond to the checklist section database 206 of FIG. 2. In addition, the inspection logic 120 retrieves a list of inspection items associated with the inspection section, and presents the list of inspection items to the inspector on the inspection device 104, as shown in a user interface screen 1000 illustrated in FIG. 10.

At step 610, the inspection logic 120 receives a selected inspection item from the inspector via the user interface screen 1000, retrieves inspection item details associated with the selected inspection item, and presents the details to the inspector on the inspection device 104 via the subwindow 1002 as shown in FIG. 10. The data items displayed in the user interface screen 1000 correspond to the checklist item database 208 of FIG. 2.

A step 612, the inspection logic 120 receives user input to the inspection item via the subwindow 1002. The user input may include a new photo taken (e.g., option 1004), a result of the inspection for the item (e.g., violation 1006, pass 1008, not applicable 1010), and added comments 1012. As shown in subwindow 1002, the user may view a previous photograph 1014 taken of an object (e.g., a storage tank, a pipe, a nozzle, or a portion of an item inspected) of the inspection side by side or adjacent with a current photograph 1004 (i.e., newly acquired photo) so as to better evaluate new or ongoing issues that develop over time. The ability to view side-by-side photographs enables the inspector to provide clear and relevant comments concerning his/her observations during a particular inspection. For example, the degree of degradation of a fuel storage tank (e.g., in terms of cracks or surface erosion) can be readily observed using the inspection photograph feature. Likewise, the subwindow 1002 displays previously submitted comments 1016 (e.g., from earlier inspections) that direct the inspector's attention to certain issues that may warrant attention. In addition, to the comments, the inspection logic 120 may be configured to also display a previous inspection result (e.g., an inspection result for the currently viewed inspection item that was documented for an inspection immediately preceding the current inspection in time or multiple inspection results for a number 'n' of previously conducted inspections to provide context over a defined period of time. As shown in FIG. 10, the current inspection result (e.g., entered in 1006, 1008, 1010, and/or comment field 1012 may be displayed in the same subwindow 1002 for easy review and comparison. Comments and photographs are captured via the logic 120 and may be stored on the inspection device 104, uploaded to the host system computer 102, or both.

At step 614, the inspection logic 120 determines whether the inspector has finished with the inspection item detail. If so, the inspector is prompted via the inspection logic 120 to return to a previous menu (e.g., from step 602, 604, 606, and 608) at step 616. Otherwise, the input provided by the inspector is transmitted over the networks 108 to the host system computer 102 and stored in the storage device 112 at step 618. To transmit the results, the inspector selects a SUBMIT 1018 option on the subwindow 1002.

As indicated above, the service application 110 enables client facilities to access inspection results in the form of reports. A sample report generated by the service application 110 for a given client facility is shown in FIG. 11. As shown in FIG. 11, a user interface screen 1100 depicts a Summary section 1102 that lists each of the inspection items that failed inspection. Following the Summary section 1102, inspection results for inspection items are displayed according to their corresponding sections.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A mobile communications device, comprising:
   a global positioning system receiver;
   a user interface configured to facilitate inspections for an entity
   a computer processor associated with the user interface;
   a storage medium; and
   executable instructions stored on the storage medium operable upon execution by the computer processor to:
   display the user interface on a display of the mobile communications device, a checklist of inspection items for an inspection site of the entity, each of the inspection items visually mapped, on the display, to a corresponding compliance code governing regulatory requirements for operation and maintenance of the entity;
   receive a unique identifier identifying an inspector at the inspection site;
   receive a user response indicative of an inspection condition for each of the inspection items, the user response implemented via an input control on the mobile communications device;
   upon receipt of a user-inputted request to transmit user responses to the inspection items over a network:
      identify a current location of the mobile communications device;
      compare the current location with an assigned inspection site determined via the user interface;
      verify a presence of the mobile communications device at the assigned inspection site based on the current location and the assigned inspection site;
      transmit the user responses over the network to a centralized database system only in response to successful verification of the presence of the mobile communications device at the assigned inspection site; and
      track inspection performance over time of the inspector based on the unique identifier,
   wherein the operations associated with the user interface further include:
      receive the user response indicative of the inspection condition for one of the inspection items via the input control on the display device, the user response including a digital photograph of an object;
         retrieve a previously submitted user response corresponding to the one of the inspection items from a memory device, the previously submitted user response associated with a previously conducted inspection, the previously submitted user response including a previously submitted digital photograph of the object and comments from the previously conducted inspection of the object, the comments including observations of the object from the previously conducted inspection; and
         simultaneously display the previously submitted digital photograph, the comments and the digital photograph within a single window of the user interface on the display device.

2. The mobile communications device of claim 1, wherein the executable instructions stored on the storage medium are further operable upon execution by the computer processor to:
   activate the global positioning system;
   receive coordinates of a location of the mobile communications device at the time of the capture of the digital photograph;
   tag the digital photograph with a timestamp associated with the capture and the coordinates; and
   transmit the coordinates, the timestamp, and the digital photograph to the centralized database system over the network, the coordinates and timestamp operable for validating an authenticity of the digital photograph with respect to the object.

3. The mobile communications device of claim 1, wherein the checklist of inspection items correspond to an object subject to inspection, the object comprising a subsystem of the entity.

4. The mobile communications device of claim 3, wherein the object includes at least one of:
   a regulated substance; and
   storage vessel.

5. A method, comprising:
   displaying, via a user interface on a display of a mobile communications device, a checklist of inspection items for an inspection site of an entity, each of the inspection items visually mapped, on the display, to a corresponding compliance code governing regulatory requirements for operation and maintenance of the entity;
   receiving, via the user interface, a unique identifier identifying an inspector at the inspection site;
   receiving, via the user interface, a user response indicative of an inspection condition for each of the inspection items, the user response implemented via an input control on the mobile communications device;
   upon receiving a user-inputted request to transmit user responses to the inspection items over a network:
   identifying, via the global positioning system, a current location of the mobile communications device;
   comparing the current location with an assigned inspection site determined via the user interface; and
   verifying, from results of the comparing, a presence of the mobile communications device at the assigned inspection site;
   transmitting the user responses over the network to a centralized database system only in response to successful verification of the presence of the mobile communications device at the assigned inspection site;
   tracking inspection performance over time of the inspector based on the unique identifier; and
   receiving the user response indicative of the inspection condition for one of the inspection items via the input control on the display device, the user response including a digital photograph of an object;
      retrieving a previously submitted user response corresponding to the one of the inspection items from a memory device, the previously submitted user response associated with a previously conducted inspection, the previously submitted user response including a previously submitted digital photograph of the object and comments from the previously conducted inspection of the object, the comments including observations of the object from the previously conducted inspection; and simultaneously displaying the previously submitted digital photograph, the comments and the digital photograph within a single window of the user interface on the display device.

6. The method of claim 5, further comprising:

activating the global positioning system of the mobile communications device;

receiving coordinates of a location of the mobile communications device at the time of the capture of the digital photograph;

tagging the digital photograph with a timestamp associated with the capture and the coordinates; and transmitting the coordinates, the timestamp, and the digital photograph to the centralized database system over the network, the coordinates and timestamp operable for validating an authenticity of the digital photograph with respect to the object.

7. The method of claim 5, wherein the checklist of inspection items correspond to an object subject to inspection, the object comprising a subsystem of the entity;

wherein the object includes at least one of:
a regulated substance; and
a storage vessel.

8. A computer program product comprising a non-transitory storage medium having instructions embodied thereon, which when executed by a computer processor cause the computer processor to implement operations, the operations comprising:

displaying, via a user interface on a display of a mobile communications device, a checklist of inspection items for an inspection site of an entity, each of the inspection items visually mapped, on the display, to a corresponding compliance code governing regulatory requirements for operation and maintenance of the entity;

receiving, via the user interface, a unique identifier identifying an inspector at the inspection site;

receiving, via the user interface, a user response indicative of an inspection condition for each of the inspection items, the user response implemented via an input control on the mobile communications device;

upon receiving a user-inputted request to transmit user responses to the inspection items over a network:

identifying, via the global positioning system, a current location of the mobile communications device;

comparing the current location with an assigned inspection site determined via the user interface; and verifying, from results of the comparing, a presence of the mobile communications device at the assigned inspection site;

transmitting the user responses over the network to a centralized database system only in response to successful verification of the presence of the mobile communications device at the assigned inspection site;

tracking inspection performance over time of the inspector based on the unique identifier; and receiving the user response indicative of the inspection condition for one of the inspection items via the input control on the display device, the user response including a digital photograph of an object;

retrieving a previously submitted user response corresponding to the one of the inspection items from a memory device, the previously submitted user response associated with a previously conducted inspection, the previously submitted user response including a previously submitted digital photograph of the object and comments from the previously conducted inspection of the object, the comments including observations of the object from the previously conducted inspection; and simultaneously displaying the the previously submitted digital photograph, the comments and the digital photograph within a single window of the user interface on the display device.

9. The computer program product of claim 8, wherein the operations further comprise:

activating the global positioning system;

receiving coordinates of a location of the mobile communications device at the time of the capture of the digital photograph;

tagging the digital photograph with a timestamp associated with the capture and the coordinates; and transmitting the coordinates, the timestamp, and the digital photograph to the centralized database system over the network, the coordinates and timestamp operable for validating an authenticity of the digital photograph with respect to the object.

10. The computer program product of claim 8, wherein the checklist of inspection items correspond to an object subject to inspection, the object comprising a subsystem of the entity; wherein the object includes at least one of:
a regulated substance; and
a storage vessel.

11. The computer program product of claim 10, wherein the regulated substance is fuel, and the storage vessel is fuel storage tank.

* * * * *